Oct. 5, 1965  B. FLOHR  3,209,778
VALVE WITH SPHERICAL PLUG
Filed March 9, 1962  2 Sheets-Sheet 1

INVENTOR
Bruno Flohr
By
[signature]

3,209,778
VALVE WITH SPHERICAL PLUG
Bruno Flohr, Berlin-Tegel, Germany, assignor to Borsig Aktiengesellschaft, Berlin-Tegel, Germany, and Werner Hartmann, Ehlershausen uber Lehrte, Germany
Filed Mar. 9, 1962, Ser. No. 179,291
Claims priority, application Germany, Mar. 15, 1961, B 61,690
3 Claims. (Cl. 137—327)

The present invention relates to a cock or valve with a spherical plug or stop, which, by means of two bearing studs is journalled in an undivided valve housing while the seal of the flow passage in the housing with regard to the plug is effected by sealing rings which are displaceable in the direction of the flow passage, and while the plug is inserted in a cylindrical bore in the housing that extends in the direction of the axis of the plug. Valves or cocks of this type are employed for shutting off gas or oil lines or other conduits conveying liquid media, especially media conveyed at a high pressure as, for instance, in excess of 100 atmospheres above atmospheric pressure.

Cocks or valves of the above-mentioned type with an undivided housing have the advantage of relatively small dimensions. The displaceable arrangement of the sealing rings has heretofore been realized by making the sealing rings displaceable by means of a screw thread within the valve housing in the direction of the flow passage. The drawback of such threads, however, consists in that, when employed in connection with valves of larger dimensions, the cost of production of such threads is rather high. Moreover, the operation of such valves is rather cumbersome because, in order to obtain the required stroke, approximately two complete revolutions have to be effected. In addition thereto, considerable difficulties are encountered when the sealing rings, after a long period of operation, have to be screwed toward the outside in order to free the plug, because the formation of crustations and rust on the thread makes a turning of the thread rather difficult and sometimes even impossible.

It is, therefore, an object of the present invention to provide a valve of the above-mentioned general type which will overcome the drawbacks outlined above.

It is another object of this invention to provide a valve with a spherical plug or stop, which will make it possible to carry out the maximum stroke by a considerably smaller revolution than was heretofore necessary.

These and other objects and advantages of the invention will appear more clearly from the following specification in connection with the accompanying drawings, in which.

Figure 1:
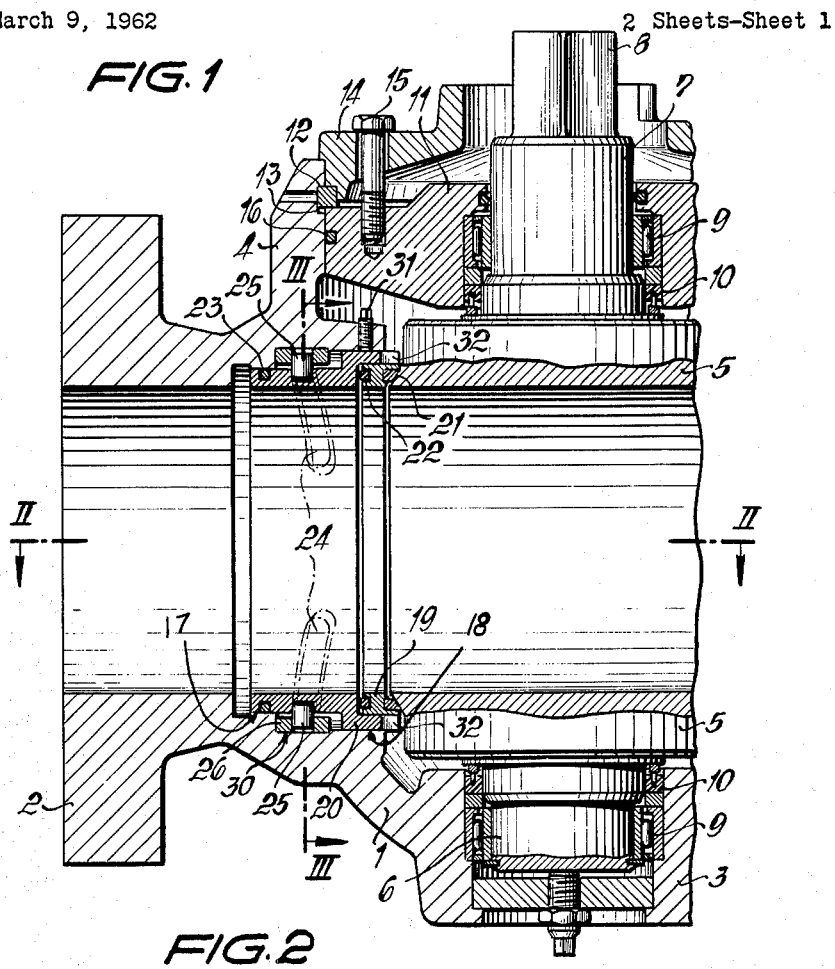
FIGURE 1 represents a vertical section through a valve according to the present invention while, for reason of symmetry between the right-hand and left-hand half of the valve, only a portion of the right-hand side has been shown.
Figure 2:
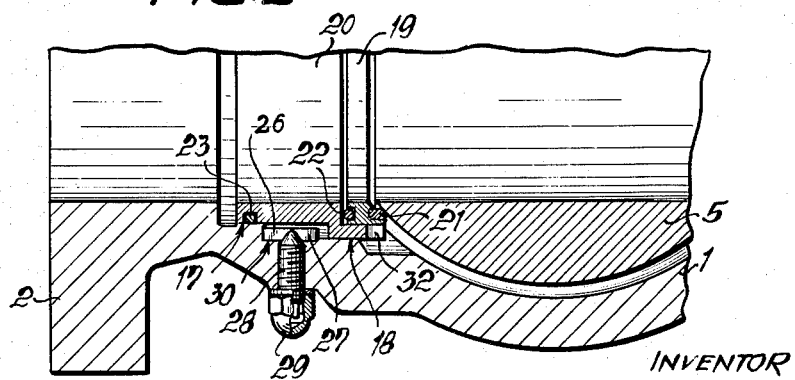
FIGURE 2 is a horizontal section along the line II—II of FIGURE 1.
Figure 3:
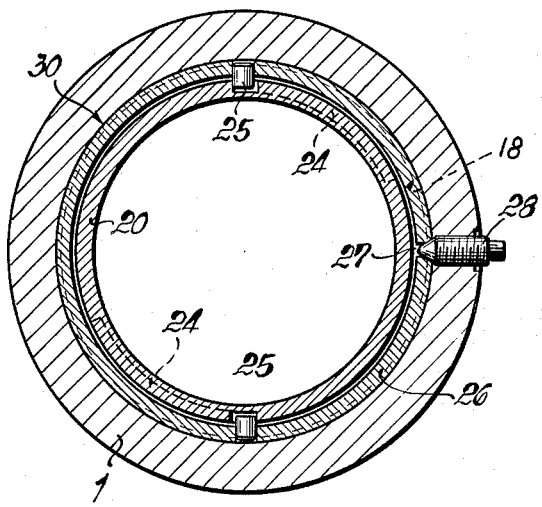
FIGURE 3 is a partial cross-section taken along the line III—III of FIGURE 1.

As mentioned above, the present invention concerns a cock or valve with a spherical stop or plug which, by means of two bearing studs, is journalled in an undivided valve housing while the seal of the plug passage in the housing with regard to the plug or stop is effected by sealing rings displaceable in the flow passage, and while the plug or stop is inserted in a cylindrical bore of the housing extending in the direction of the axis of the plug. The valve according to the present invention is characterized in that a guiding bushing operable to displace the sealing ring in the direction of the flow passage has its outer surface provided with screw-shaped or helical guiding slots into which a portion of pins extend with slight play, whereas the other portion of said pins is held stationary in bores relative to the valve housing. The invention is furthermore characterized in that, for purposes of its movement in the direction of flow, said guiding bushing is rotatably journalled and rotatable by means of a wrench or tool. Advantageously, the screw-shaped or helical guiding slots have such a pitch that the total stroke of the guiding bushing in the direction of flow can be effected by approximately a quarter-revolution of the guiding bushing.

In order to obtain as uniform sealing pressures as possible over the entire circular circumference, the screw-shaped or helical guiding slots and the pins are each provided in bores and opposite to each other.

The bores, by means of which the pins are held stationary relative to the valve housing, are preferably mounted in an open spring ring. In this connection, it is advantageous to mount the spring ring, which carries the bores of the pins, in an annular recess of the valve housing and to spread said spring ring by means of a screw having a conical tip and extending through the valve housing.

In order to prevent any accidental displacement of the guiding bushing out of its operative position, the guiding bushing, after establishing the sealing position between the sealing ring and the plug, is secured against rotation by a set-screw. The guiding bushing has its circumference provided with slots or bores or other uneven means may be employed which may be engaged by a hook wrench or hook spanner for rotating the guiding bushing.

The sealing ring which seals the flow passage with regard to the plug, is advantageously held by a separate ring mounted in the guiding bushing, said ring being sealed relative to said guiding bushing by a resilient sealing ring.

Referring now to the drawing in detail, the valve shown therein comprises a valve housing 1 with a connecting flange 2, a bottom portion 3 and a neck 4. The spherical plug 5 is provided with bearing studs 6 and 7 one of which, the stud 7, is provided with a square head 8 for receiving a wrench to actuate the plug. If a valve of large dimensions is concerned, the actuation of the plug may be effected mechanically, for instance, by means of an electric motor, through the intervention of corresponding transmission means.

The valve shown in the drawing furthermore comprises a bearing 9 which may, for instance be a needle bearing, and corresponding seals 10. In view of the inner high pressure, lid 11 rests against a multi-sectional ring 12 which is inserted in an annular groove 13 of the neck 4 of housing 1. The closure plate 14 is by means of screws 15 clamped against lid 11 and ring 12. Furthermore, an O-ring 16 is inserted in the peripheral wall of lid 11.

Cylindrical recesses 17 and 18 are provided in housing 1 for receiving a guiding bushing 20 carrying the bearing ring 19. Ring 19 receives the sealing ring 21 which effects a seal relative to the spherical stop 5 and may consist of a synthetic material as, for instance a material sold under the name of Kel-F and comprising polychlorotrifluoroethylene or any other suitable material. The arrangement furthermore comprises a resilient sealing ring 22 and a further O-ring 23. The surface of the guiding bushing 20 is provided with helical or screw-shaped guiding slots 24 which are slidably engaged by a portion of the length of pins 25, whereas the remaining length of said pins is held in bores provided in a spring ring 26. The spring ring is opened by a gap 27 and is spread by means of a screw 28 extending through the wall of the housing 1. During operation, screw 28 is covered by a closure cap 29 which simultaneously exerts a sealing effect. Spring ring 26 is received by a groove 30 in the interior of housing 1. For purposes of determining and arresting the position of the guiding bushing 20 during the operation, a set-screw 31 is provided. At the marginal portion of the guiding bushing 20, slots 32 or bores are provided which may be engaged by a hook-wrench for purposes of rotating the guiding bushing.

When the spherical stop, after a sufficient period of operation is to be removed from the valve, first the parts 15, 14, 12 and 11 have to be removed. Thereupon, the set-screw 31 has to be loosened. By means of a hook-wrench engaging the slots 32 or bores or the like, a rotation of the guiding bushing 20 is effected in such a direction that the guiding bushing, due to the influence of the helical guiding surface 24 and pins 25, will be displaced in outward direction. The guiding slots 24 have such a pitch that the entire required stroke of the guiding bushing 20 may be effected by approximately one-quarter of a revolution of the guiding bushing.

By the same steps, also the guiding bushing in the right-hand side of the housing 1 (not shown) has to be moved in outward direction. In this way, the path for removing the plug 5 will be free.

When the plug is to be reinserted, following its introduction, the guiding bushing 20 has to be rotated in reverse direction until the required sealing pressure between parts 5 and 21 has been obtained. This may be effected by rotation of the square head 8. Subsequently, the arresting screw 31 is again tightened, and parts 11, 12, 14 and 15 are installed.

The sealing ring 21 advantageously consists of synthetic material such as polychlorotrifluoroethylene or any other suitable material. Minor wear or deformation of the sealing ring 21 which might bring about a reduction in the sealing pressure between parts 5 and 21, can be compensated for to a great extent by the resilient properties of the sealing ring 22, so that it will be necessary only after rather long periods of operation, to effect a corresponding adjustment of the sealing pressure between parts 5 and 21 by a slight rotation of guiding bushing 20 after previous removal of parts 15, 14, 12 and 11.

It is, of course, to be understood that the present invention is, by no means, limited to the particular construction shown in the drawing, but also comprises any modifications within the scope of the appended claims.

What I claim is:

1. In combination in a valve: a housing having a passage therethrough for conveying a fluid, said housing being provided with a bore intersecting said passage and having its axis at an angle with regard to the axis of said passage, a rotatable plug mounted in said bore and having its ends provided with bearing studs rotatably journalled in said housing, said plug having a first rotated position wherein flow is established through said passage and a second rotated position wherein flow is interrupted through said passage, sealing ring means in said housing surrounding said passage on opposite sides of said plug and displaceable in axial direction of said passage for sealing engagement with said plug to thereby seal said passage relative to said bore, rotatable bushing means adjacent said sealing ring means on the sides of said sealing ring means opposite said plug and axially displaceably mounted within said housing and adjustable therein to press said sealing ring means against said plug, said bushing means having its outer surface provided with helical grooves, open spring ring means adjacent said bushing means having ends spaced from each other, locking means engaging said spring ring means so as to lock the same stationary with regard to said housing, and a plurality of pins located in said spring ring means and in slidable engagement with said helical grooves.

2. In combination in a valve: a housing having a passage therethrough for conveying a fluid, said housing being provided with a bore intersecting said passage and having its axis at an angle with regard to the axis of said passage, a rotatable plug mounted in said bore and having its ends provided with bearing studs rotatably journalled in said housing, said plug having a first rotated position wherein flow is established through said passage and a second rotated position wherein flow is interrupted through said passage, sealing ring means coaxial with said passage on opposite sides of said plug and displaceable in axial direction of said passage for sealing engagement with said plug to thereby seal said passage relative to said bore, rotatable bushing means adjacent said sealing ring means on the sides of said sealing ring means opposite said plug and axially displaceably mounted within said housing and adjustable to press said sealing ring means against said plug, said bushing means having its outer surface provided with helical grooves, open spring ring means adjacent said bushing means having ends spaced from each other, said spring ring means being mounted in an annular recess provided in said housing and substantially coaxial with regard to said passage, screw means provided with a conical point extending between the ends of said spring ring means so as to spread said ends apart and to lock said spring ring means in said housing, and a plurality of pins carried by said spring ring and in sliding engagement with said grooves.

3. In combination in a valve: a housing having a passage therethrough for conveying a fluid, said housing being provided with a bore intersecting said passage and having its axis at an angle with regard to the axis of said passage, a rotatable plug mounted in said bore and having its ends provided with bearing studs rotatably journalled in said housing, said plug having a first rotated position wherein flow is established through said passage and a second rotated position wherein flow is interrupted through said passage, sealing ring means in said housing surrounding said passage on opposite sides of said plug and displaceable in axial direction of said passage for sealing engagement with said plug to thereby seal said passage relative to said bore, supporting ring means having means at one end supporting said sealing ring means, rotatable bushing means in said passage on opposite sides of said plug axially displaceably mounted within said housing and provided with shouldered recess means having said supporting ring means located therein, seal means sealing said bushing means to said housing, said bushing means being adjustable toward said plug to move said supporting ring means toward said plug and thereby to press said sealing ring means against said plug into sealing engagement with said plug, resilient sealing ring means on the other end of said supporting ring means and engaging the shoulder of said recess means of said bushing means for sealing the supporting ring means and bushing means relative to each other, said bushing means having helical grooves provided in the outer surface thereof, a plurality of pins stationarily arranged with regard to said housing and in sliding engagement with said grooves, and means for selectively adjusting the angular position of said bushing means in said housing, said bushing means and support ring means and sealing ring means remaining stationary in said housing during rotation of said plug.

References Cited by the Examiner

UNITED STATES PATENTS

| | | | |
|---|---|---|---|
| 712,350 | 10/02 | Williamson | 251—159 |
| 783,953 | 2/05 | Henry | 251—172 |
| 1,931,797 | 10/33 | Howard | 251—159 X |
| 1,980,699 | 11/34 | Robinson | 251—159 X |
| 2,639,883 | 5/53 | Smith | 251—170 |
| 2,661,926 | 12/53 | Resek | 251—174 X |
| 2,709,455 | 5/55 | Greenwood | 251—159 X |
| 2,868,497 | 1/59 | Graham | 251—172 |

FOREIGN PATENTS 559,270 of 1958 Canada.
1,102,510 of 1961 Germany.

ISADOR WEIL, *Primary Examiner.*

M. CARY NELSON, *Examiner.*